United States Patent
Rancich et al.

(10) Patent No.: US 9,278,507 B2
(45) Date of Patent: Mar. 8, 2016

(54) METHOD FOR MAKING A FILM/BOARD LAMINATION

(71) Applicant: Illinois Tool Works Inc., Glenview, IL (US)

(72) Inventors: Michael J. Rancich, Houston, TX (US); Ronald C. Hoffart, Jr., Porter, TX (US)

(73) Assignee: Illinois Tool Works Inc., Glenview, IL (US)

( * ) Notice: Subject to any disclaimer, the term of this patent is extended or adjusted under 35 U.S.C. 154(b) by 78 days.

(21) Appl. No.: 13/706,528

(22) Filed: Dec. 6, 2012

(65) Prior Publication Data

US 2013/0146222 A1 Jun. 13, 2013

Related U.S. Application Data

(60) Provisional application No. 61/569,679, filed on Dec. 12, 2011.

(51) Int. Cl.
| | | |
|---|---|---|
| *B65D 73/00* | (2006.01) | |
| *B32B 37/00* | (2006.01) | |
| *B32B 27/32* | (2006.01) | |
| *B32B 7/12* | (2006.01) | |
| *B32B 27/10* | (2006.01) | |

(52) U.S. Cl.
CPC . *B32B 27/32* (2013.01); *B32B 7/12* (2013.01); *B32B 27/10* (2013.01); *B32B 2307/31* (2013.01); *B32B 2307/516* (2013.01); *B32B 2307/5825* (2013.01); *B32B 2553/00* (2013.01); *B65D 73/0078* (2013.01); *B65D 73/0085* (2013.01); *B65D 73/0092* (2013.01)

(58) Field of Classification Search
CPC ................................. B65D 73/0078–73/0092
USPC .......................................................... 206/462
See application file for complete search history.

(56) References Cited

U.S. PATENT DOCUMENTS

| | | |
|---|---|---|
| 4,981,213 A | 1/1991 | Dillon |
| 5,091,261 A | 2/1992 | Casey et al. |
| 5,116,649 A | 5/1992 | Massouda |
| 5,506,011 A | 4/1996 | Farrell et al. |
| 5,522,505 A | 6/1996 | Giovannone |
| 5,565,252 A | 10/1996 | Finestone et al. |
| 5,690,775 A | 11/1997 | Calvert et al. |
| 5,927,500 A | 7/1999 | Godfrey et al. |
| 6,010,784 A | 1/2000 | Peterson |
| 6,047,829 A | 4/2000 | Johnstone et al. |
| 6,050,415 A | 4/2000 | Lind et al. |
| 6,149,993 A | 11/2000 | Parks et al. |
| 6,193,827 B1 | 2/2001 | Parks et al. |

(Continued)

FOREIGN PATENT DOCUMENTS

| | | |
|---|---|---|
| CN | 1436120 A | 8/2003 |
| CN | 1611348 A | 5/2005 |

(Continued)

*Primary Examiner* — Carson Gross
(74) *Attorney, Agent, or Firm* — Levenfeld Pearlstein, LLC

(57) ABSTRACT

A method for making a film/board laminate for use in pilfer resistant packaging includes providing a non-treated paperboard substrate, adhering a single ply of an oriented film to the substrate, the oriented film being applied at an orientation angle to the board between but not equal to zero degrees and 180 degrees such that a film to substrate adhesion is about 0.5 pli to 1.4 pli, and applying a heat seal layer to the film.

25 Claims, 2 Drawing Sheets

(56) References Cited

U.S. PATENT DOCUMENTS

| | | |
|---|---|---|
| 6,230,964 B1 | 5/2001 | Saito |
| 6,245,395 B1 | 6/2001 | Falat et al. |
| 6,284,344 B1 | 9/2001 | Barnes et al. |
| 6,308,832 B1 | 10/2001 | Pirro et al. |
| 6,346,332 B1 | 2/2002 | Bryden et al. |
| 6,540,862 B1 | 4/2003 | Calvert et al. |
| 6,676,584 B2 | 1/2004 | Tachikawa et al. |
| 6,691,870 B1 | 2/2004 | Palm et al. |
| 6,752,272 B2 | 6/2004 | Jones et al. |
| 7,051,876 B2 | 5/2006 | Grosskopf |
| 7,097,895 B2 | 8/2006 | Amendt et al. |
| 7,192,640 B2 | 3/2007 | Holbert et al. |
| 7,207,441 B2 | 4/2007 | Ritter |
| 7,475,779 B2 | 1/2009 | Kellar et al. |
| 7,571,810 B2 | 8/2009 | Tilton |
| 7,607,539 B2 | 10/2009 | Freeze |
| 7,621,400 B2 | 11/2009 | Smith et al. |
| 7,658,287 B2 | 2/2010 | Hession |
| 7,673,752 B2 | 3/2010 | Levy |
| 7,681,733 B2 | 3/2010 | Grosskopf |
| 7,699,173 B2 | 4/2010 | Hession |
| 7,726,481 B2 | 6/2010 | Grosskopf |
| 2002/0050119 A1 | 5/2002 | Gatewood et al. |
| 2002/0189964 A1 | 12/2002 | Mazurek |
| 2003/0148064 A1* | 8/2003 | Rasmussen ............ 428/119 |
| 2003/0148110 A1 | 8/2003 | Holbert et al. |
| 2005/0084662 A1* | 4/2005 | Amendt et al. ............ 428/212 |
| 2006/0016711 A1 | 1/2006 | Ritter |
| 2007/0062836 A1 | 3/2007 | Nazari |
| 2007/0068844 A1 | 3/2007 | Weston |
| 2007/0114153 A1 | 5/2007 | Ritter |
| 2007/0114154 A1 | 5/2007 | Ritter |
| 2007/0125678 A1 | 6/2007 | Green |
| 2007/0166492 A1* | 7/2007 | Holbert et al. ............ 428/35.7 |
| 2007/0202324 A2 | 8/2007 | Hawes |
| 2007/0209957 A1 | 9/2007 | Glenn et al. |
| 2007/0267318 A1* | 11/2007 | Grosskopf ............ 206/531 |
| 2008/0093252 A1 | 4/2008 | Hession |
| 2008/0142393 A1 | 6/2008 | Grosskopf |
| 2008/0190809 A1 | 8/2008 | Simon et al. |
| 2008/0223747 A1 | 9/2008 | Grosskopf |
| 2008/0268158 A1 | 10/2008 | Fugitt et al. |
| 2009/0038977 A1 | 2/2009 | Titlton |
| 2009/0045093 A1 | 2/2009 | Tilton |
| 2009/0101534 A1 | 4/2009 | Wills |
| 2009/0184023 A1 | 7/2009 | Brollier et al. |
| 2009/0223840 A1 | 9/2009 | Nazari |
| 2009/0308775 A1 | 12/2009 | Hession et al. |
| 2010/0011635 A1 | 1/2010 | Sipe et al. |
| 2010/0084300 A1 | 4/2010 | Hession et al. |
| 2010/0105534 A1 | 4/2010 | Nazari |
| 2010/0170821 A1 | 7/2010 | Grosskopf |

FOREIGN PATENT DOCUMENTS

| | | |
|---|---|---|
| CN | 1646305 A | 7/2005 |
| EP | 1629973 A1 | 3/2006 |
| EP | 1142703 B1 | 6/2006 |
| EP | 1478508 B1 | 3/2010 |
| WO | 9826994 A1 | 6/1998 |
| WO | 9950066 A1 | 10/1999 |

* cited by examiner

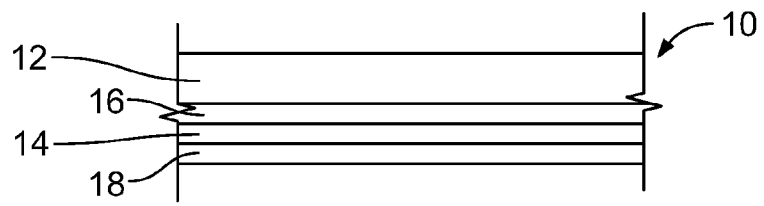
FIG. 1
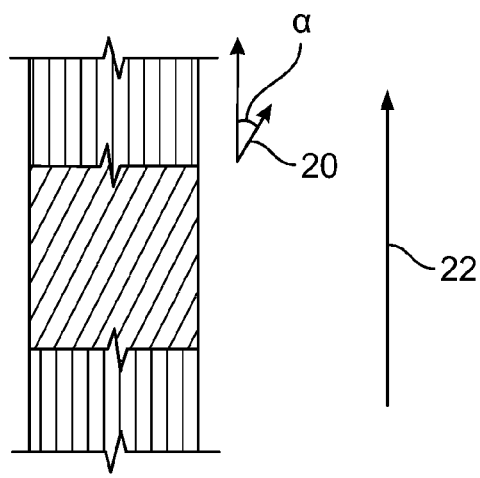
FIG. 2
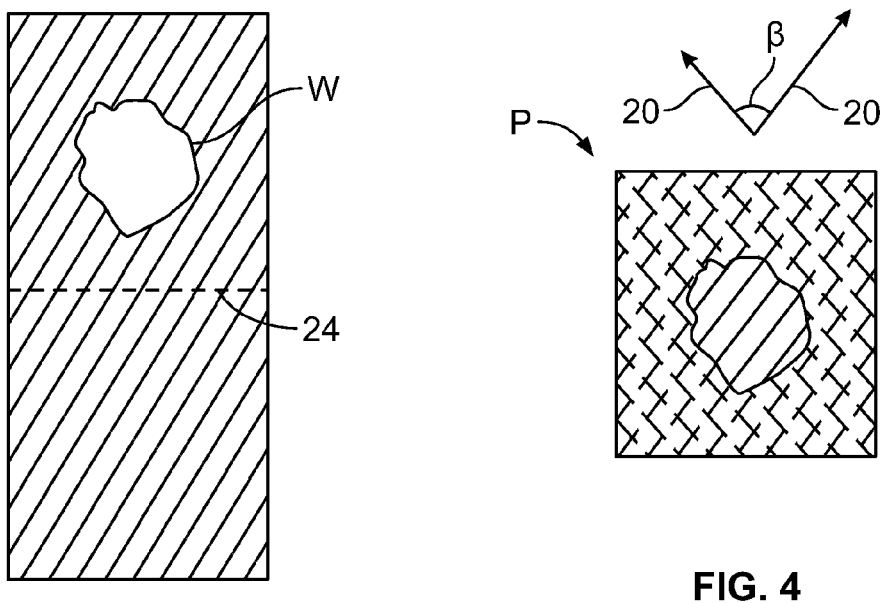
FIG. 3
FIG. 4

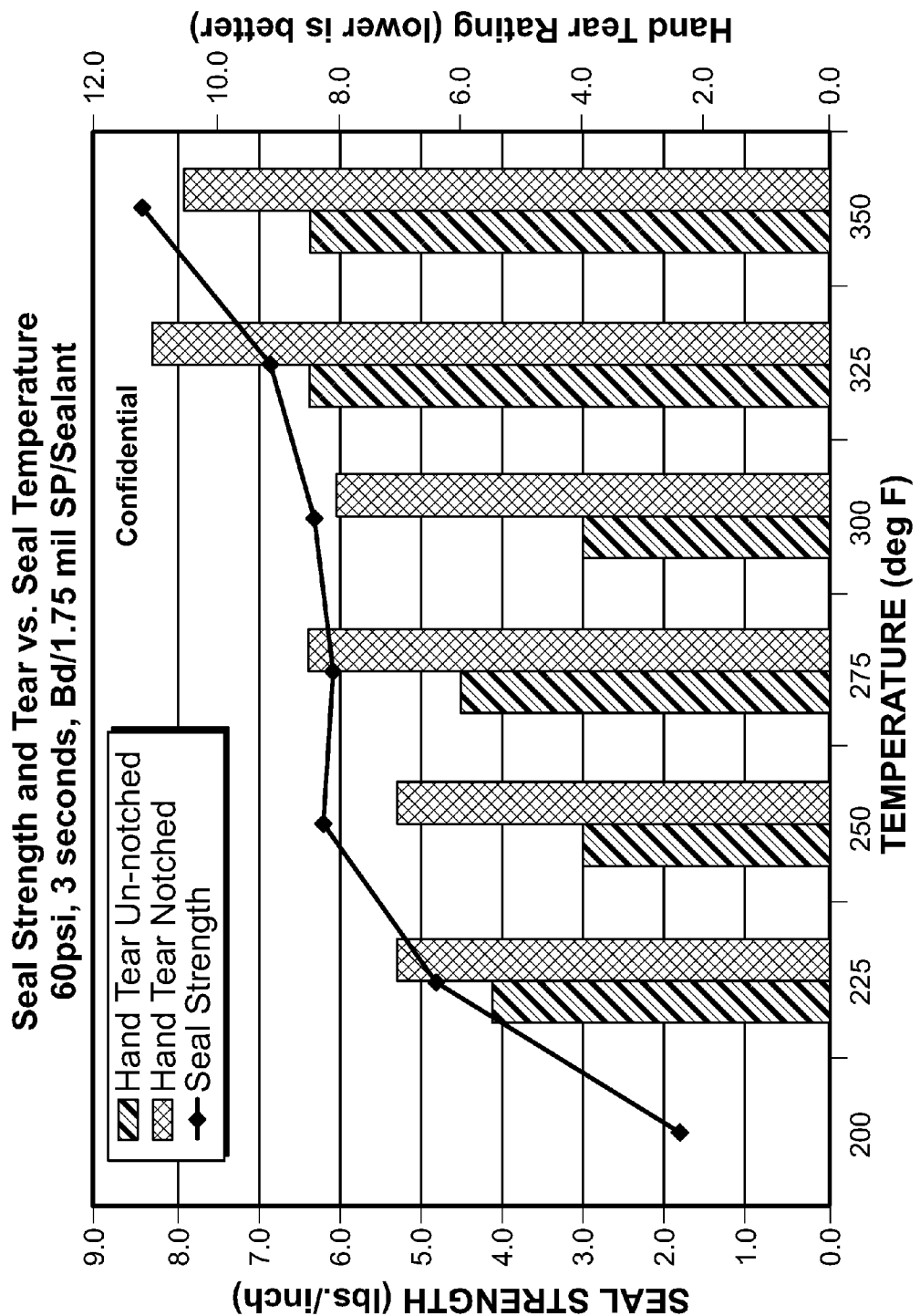

METHOD FOR MAKING A FILM/BOARD LAMINATION

BACKGROUND

Packaging materials are used in every manner of everyday life. Corrugated packaging materials were used as early as the 1870s to protect fragile and valuable objects during packing and handling. Many of the paper, paperboard and fiberboard materials used in the manufacture of early corrugated materials are still in use today in their basic form and/or with slight improvements.

In present day use, packaging serves a number of purposes. Aside from traditional protection functions, in many instances, packaging must also serve a pilfer deterrent function. This is particularly so for smaller, more valuable items.

Although traditional packaging, e.g., paperboard or corrugated board, with various coatings serve protection functions well, they do not provide a substantial level of pilfer resistance. As such, more rugged, tear resistant materials have been incorporated into packaging materials to meet today's requirements.

One type of packaging material includes a tear resistant film, such as a cross-oriented, laminated film in a laminate with a paperboard substrate. One such film is a VALERON® film, which is a cross-oriented, laminated polyolefin film commercially available from VALERON® Strength Films, an Illinois Tool Works company, of Houston, Tex. One structure using such a film is disclosed in Amendt, U.S. Pat. No. 7,097,895, which patent is commonly assigned with the present application and is incorporated herein by reference.

While such a laminate better serves both the protective and pilfer resistant requirements for merchandising, the two film layers increase the costs for such packaging. As such, a lower cost option is desirable.

In addition, it has also been found that the level of adhesion of the film to the paperboard substrate can impact the tear resistance of the package. Specifically, it has been found that if the adhesion of the film to the paperboard substrate is too great, tear propagation resistance decreases.

Accordingly, there is a need for a packaging material and a method for making the packaging material that provides protection for the packaged item, as well as a pilfer resistant structure. Desirably, such a material is provided at a low cost, and uses known material elements within the material structure. More desirably still, such a material can be manufactured using known techniques.

SUMMARY

A method for making a film/board laminate for use in pilfer resistant packaging, includes providing a non-treated paperboard substrate and adhering a single ply of a monoaxially oriented film to the substrate. The film is applied at an orientation angle to the board between but not equal to zero degrees and 180 degrees, such that a film to substrate adhesion is about 0.5 pli to 1.4 pli, and preferably about 0.7 pli to about 1.1 pli. A heat seal layer is applied to the film.

The adhesion strength pli is measured substantially immediately following the laminating step and is no more than about 1.6 pli, and preferably no more than about 1.4 pli four days following the adhering step.

The film is preferably an oriented polyolefin film. A suitable film is a polyethylene film, more preferably a high density polyethylene (HDPE) film. The HDPE film is a spiral cut film cut an angle of about 37 degrees to 57 degrees relative to a machine direction, and preferably about 37 degrees to about 41 degrees relative to the machine direction.

The method can include folding the film/board laminate over onto itself with the oriented film layers confronting one another. In this arrangement, when the film/board laminate is folded over onto itself, the heat seal layers contact one another, and the confronting oriented films are cross-oriented relative to one another at an angle of about 74 degrees to about 114 degrees. A packaged item can be contained within an opening in one or both of the film/board laminate layers enclosed within, for example, a clear portion that is sandwiched between the confronting film/board layers.

These and other features and advantages of the present invention will be readily apparent from the following detailed description, in conjunction with the claims.

DESCRIPTION OF THE DRAWINGS

The benefits and advantages of the present invention will become more readily apparent to those of ordinary skill in the relevant art after reviewing the following detailed description and accompanying drawings, wherein:

FIG. 1 is a cross-sectional view of a film/board laminate;

FIG. 2 illustrates the orientation of the film on a board substrate;

FIG. 3 is a view of the film/board laminate having formed for making a package in which the laminate has an opening therein to accommodate, for example, a (plastic) window covering;

FIG. 4 illustrates the laminate of FIG. 3 that has been folded over onto itself to establish the package; and FIG. 5 is a graphical representation the seal strength and tear resistance of various samples of board/film laminates made at various seal temperatures.

DETAILED DESCRIPTION

While the present disclosure is susceptible of embodiment in various forms, there is shown in the drawings and will hereinafter be described a presently preferred embodiment with the understanding that the present disclosure is to be considered an exemplification thereof and is not intended to be limited to the specific embodiment illustrated.

FIG. 1 illustrates an exemplary film/board lamination 10. The lamination 10 (or laminate) is formed from a base or substrate layer 12 and a film layer 14 that are adhered to one another. An extrudate or adhesive 16 is provided between the film 14 and the substrate 12. Accordingly, the laminate 10 can be formed by extrusion, adhesive lamination or a combination of extrusion and adhesive lamination. The laminate 10 further includes a heat seal layer 18 on the film 14, opposite of the extrudate 16/substrate 12 layer. The heat seal layer 18 provides for folding the laminate 10 onto itself the for fabrication of a package (for example, as seen in FIGS. 3 and 4).

In an embodiment, the film 14 is high density polyethylene (HDPE) or a combination of HDPE and low density polyethylene (LDPE) such as that described in Barnes, U.S. Pat. No. 6,284,344, which is commonly assigned with the present application and is incorporated herein by reference. The film of Barnes is a multi-layer film in which at least two of the layers are cross-oriented. That is, at least two of the layers are oriented (each monoaxially oriented), relative to the machine direction, at an angle to one another. Other suitable materials include polypropylene or a variety of other polyolefin materials and blends, polyamides, polyethylene terephthalate and other thermoplastic materials capable of being oriented. A discussion of forming multi-layer, oriented or "bias-cut" plastic films is described in Barnes et al.

In a present film/board laminate 10, a single ply of the film 14 is used rather than the multi-ply cross-oriented film. The single ply film 14 is adhered or affixed to the substrate 12 in a direction such that the film orientation (as indicated at 20 in FIG. 2) is at an angle α of about 37 degrees to about 57 degrees, and preferably about 37 degrees to about 41 degrees, relative to the machine direction of the laminate 10 (indicated at 22) or a longitudinal direction L of the package, as seen in FIG. 3. As such when the laminate 10 is folded along a fold line 24, creating a sandwich construction, as seen in FIG. 4, the orientations of the two plies of film 14 (each mounted to the substrate 12) are at an angle β of about 74 degrees to about 114 degrees, and preferably about 74 degrees to about 82 degrees, to one another. This effectively results in a package P with film ply orientations that are at an angle β to one another which increases tear resistance.

It has also been found that the level of adhesion between the film 14 and board 12 is important to produce an optimum product. Surprisingly, it has been found that the highest levels of adhesion do not produce the optimum laminate 10 construction. It has been observed that too great a level of adhesion results in a laminate construction in which the resistance to tear propagation is less than that in which lower levels of adhesion are established. Of course, too low of an adhesion level also negatively impacts the characteristics of the laminate. Bond strength can be controlled by lamination nip pressure, extrudate type and temperature, primers and the like.

One way in which the level of adhesion is increased is by treatment, such as corona treatment, flame treatment, plasma treatment and the like, of the substrate prior to adhering to the film. It has however, been found that when the substrate is treated, the adhesion level increases with time following manufacture of the laminate.

It will be understood that often, the substrate, such as a paperboard material, is treated during the manufacturing process. In the manufacture of laminates, often the surfaces of one or more of the plies or layers is treated to, for example, increase the adhesion between the layers. Surface treatments include corona treatment, flame treatment, plasma treatment and the like. Typically, surface treatment is carried out just prior to the lamination process. Accordingly it will be understood that for purposes of the present disclosure, the term untreated or non-treated means board or substrate that is not surface treated prior to lamination by any of the above-noted methods or other treatments intended to increase adhesion between the layers.

Table 1 below shows the bond strength of a laminate with treated and untreated board immediately off of the manufacturing line and four days post manufacture. The values in Table 1, below are the force required to separate (pull) the film from the substrate in pounds per linear inch (pli).

TABLE 1

Bond Strength Results on 18 pt Board//4.0 mil VALERON ® Strength Film//Heat Seal Laminations

|  | Avg. Bond Offline (pli) | Avg. Bond After 4 days (pli) |
|---|---|---|
| Board Treated | 1.17 | 2.16 |
| Board - No Treatment | 1.16 | 1.39 |

While conventional thought has it that a stronger bond is more desirable, it has been found that to obtain a desirable tear strength, a target bond strength of about 0.5 to 1.4 pounds per linear inch (pli) and preferably about 0.7 to 1.1 pli provides better overall tear resistance with aging of the laminate post manufacture. The above exemplary characteristics are for oriented and cross-laminated films, however, similar results are anticipated for single ply films laminated to a board.

It has also been found that the cut angle of the film, that is the angle at which the film is cut relative to the machine direction of the film (during manufacture), which can be the same as the angle α at which the film 14 is adhered to the substrate 12, has an effect on tear performance. As noted in Table 2, below, spiral cut angles (as measured as shown in FIG. 2) between about 46 degrees and 57 degrees provide good tear performance, while spiral cut narrow angles (e.g., about 39 degrees) provide the best observed tear resistance.

TABLE 2

Hand Tear Results on Pilfer Coupons vs. Spiral Cut Film Angle

| Single Ply Film Spiral Cut Angle | Tear Type | # of Failures/# of Tests (into center of coupon) |
|---|---|---|
| 39° | Un Notched | 0/32 |
|  | Notched | 2/32 |
| 45° | Un Notched | 1/32 |
|  | Notched | 5/32 |
| 57° | Un Notched | 0/32 |
|  | Notched | 4/32 |

The tear results of Table 2 are shown for 4 inch by 4 inch sample boards, both notched and un-notched for spiral cut films of 39 degrees, 45 degrees and 57 degrees. While the laminates 10 all provided acceptable tear resistance, it was found that the narrower spiral cut angles (e.g., about 39 degrees) were observed to provide tear resistance superior to those of wider spiral cut angles.

It has also been observed that when highly oriented films 14 are used, particularly those with orientation not parallel to the machine direction, there is a high likelihood of film 14 web tears and breaks. As such, it has been found that the tension on the oriented film is preferably below 0.3 pli.

It has also been found that the heat seal layer 18 should contain a material that allows a low seal initiation temperature. When the laminate 10 is heat sealed to itself (for example, as shown in FIG. 4), sealing temperatures over 250° F. reduce tear resistance, particularly uninitiated tear. Without being held to theory, this may be due to high interply adhesion (that is, between the confronting film 14 plies) or melting (or relaxation of the orientation) of the film 14 plies due to the higher sealing temperatures used. FIG. 5 is a graphical representation of the seal strength and tear versus seal temperature. The measurements were taken using a substrate adhered to a 1.75 mil (1.75/1000 inch) single ply HDPE monoaxially oriented film with a low seal initiation temperature heat seal layer. The laminate was sealed at 60 psi for a period of three seconds. The graph shows hand tear results for both un-notched and notched samples in the right-hand and left hand columns, respectively, at varying temperatures, with the tear ratings being shown on the right-hand vertical axis. The seal strength, in pounds per inch, indicated by the line above the columns tear strength columns, exhibited the values as shown along the left-hand vertical axis, all as a function of seal temperature in degrees F., which is shown along the horizontal axis. In the graph, lower hand tear values indicate greater resistance to tearing (lesser depth of tear into the sample).

One or both of the film/board laminate 10 layers can include an opening, such as the exemplary window W, and a packaged item can be contained within the opening in one or both of the layers. The item can be contained within a window (such as a suitable plastic material) that is sandwiched between the confronting film/board layers 10 that are sealed to one another with the heat seal layers 18 in contact with one another.

In the disclosures, the words "a" or "an" are to be taken to include both the singular and the plural. Conversely, any reference to plural items shall, where appropriate, include the singular.

From the foregoing it will be observed that numerous modification and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method for making a film/board laminate for use in pilfer resistant packaging, comprising the steps of:
   providing a non-treated paperboard substrate;
   adhering a single ply of an oriented film to the substrate, the oriented film being applied at an orientation angle to the board between but not equal to zero degrees and 180 degrees, wherein adhering the single ply of the oriented film to the substrate includes controlling adhesion of the film to the substrate to be about 0.5 pli to 1.4 pli thereby forming a pilfer resistant laminate; and
   applying a heat seal layer to the film,
   wherein an entirety of the laminate is pilfer resistant and the adhesion of the film to the substrate at a time of manufacture is related to a resistance to tear propagation of the laminate at a time after manufacture.

2. The method of claim 1 wherein the film to substrate adhesion is about 0.7 pli to 1.1 pli.

3. The method of claim 1 wherein the film to substrate adhesion is measured immediately following the adhering step and is no more than 1.4 pli four days following the adhering step.

4. The method of claim 1 wherein the oriented film is an oriented polyolefin film.

5. The method of claim 4 wherein the film is a polyethylene film.

6. The method of claim 5 wherein the polyethylene film is a high density polyethylene (HDPE) film.

7. The method of claim 6 wherein the HDPE film is a spiral cut film cut at an angle of about 37 degrees to 57 degrees relative to a machine direction of the film.

8. The method of claim 7 wherein the spiral cut film is cut an angle of about 37 degrees to 41 degrees relative to the machine direction of the film.

9. The method of claim 1 wherein the film/board laminate is folded over onto itself with the heat seal layers confronting one another.

10. The method of claim 1 wherein the film/board laminate is folded over onto itself with the heat seal layers contacting one another, and wherein the confronting oriented films are cross-oriented relative to one another at an angle of about 74 degrees to 114 degrees from a machine direction of the film.

11. The method of claim 1 wherein the film/board laminate is heat sealed to another film/board laminate, with the heat seal layers confronting one another at a predetermined temperature and pressure.

12. The method of claim 11 wherein the predetermined temperature is about 250 degrees F. to 350 degrees F.

13. The method of claim 11 wherein the film is monoaxially oriented.

14. A method for making a film/board laminate for use in pilfer resistant packaging, comprising the steps of:
   providing a non-treated paperboard substrate;
   adhering a single ply of an oriented polyolefin film to the substrate, the oriented polyolefin film being applied at an orientation angle to the board between but not equal to zero degrees and 180 degrees, the oriented polyolefin film being a spiral cut film cut at an angle of about 37 degrees to 57 degrees, and wherein adhering the single ply of the oriented polyolefin film to the substrate includes controlling adhesion of the film to the substrate to be about 0.5 pli to 1.4 pli immediately following the adhesion step and is no more than about 1.6 pli four days following the adhering step to form a pilfer resistant laminate; and
   applying a heat seal layer to the film,
   wherein an entirety of the laminate is pilfer resistant and the adhesion of the film to the substrate at a time of manufacture is related to a resistance to tear propagation of the laminate at a time after manufacture.

15. The method of claim 14 wherein the oriented polyolefin film is spiral cut at an angle of about 37 degrees to 41 degrees.

16. The method of claim 14 wherein the film to substrate adhesion is about 0.7 pli to 1.1 pli.

17. The method of claim 14 wherein the film to substrate adhesion is about 1.4 pli four days following the adhering step.

18. The method of claim 14 wherein the oriented polyolefin film is a polyethylene film.

19. The method of claim 18 wherein the polyethylene film is a high density polyethylene (HDPE) film.

20. The method of claim 14 wherein the film/board laminate is folded over onto itself with the heat seal layers contacting one another, and wherein the confronting oriented films are cross-oriented relative to one another at an angle of about 74 degrees to 114 degrees from a machine direction of the film.

21. The method of claim 14 wherein the film/board laminate is heat sealed to another film/board laminate at a predetermined temperature and pressure.

22. The method of claim 21 wherein the predetermined temperature is about 250 degrees F. to 350 degrees F.

23. The method of claim 21 wherein the predetermined pressure is about 60 psi.

24. The method of claim 14 wherein the film is monoaxially oriented.

25. The method of claim 1, further comprising forming a window in one of or both of the film and substrate.

* * * * *